United States Patent Office 3,532,625
Patented Oct. 6, 1970

3,532,625
OLEOPHILIC GRAPHITE
Aleksander Jerzy Groszek, London, and Douglas Keith Nicholas, Hampton, Middlesex, England, assignors to The British Petroleum Company Limited, London, England
No Drawing. Filed Feb. 17, 1969, Ser. No. 799,921
Claims priority, application Great Britain, Feb. 20, 1968, 8,175/68
Int. Cl. C10m 5/02
U.S. Cl. 252—29                                       2 Claims

ABSTRACT OF THE DISCLOSURE

Greases thickened by a graphitic carbon having a ratio of heat of adsorption of n-dotriacontane from n-heptane to the heat of adsorption of n-butanol from n-heptane of at least 3.5:1 and a heat of adsorption of n-dotriacontane of at least 1 calorie per gram produced by the partial oxidation of hydrocarbons in a process in which not more than 10% of the carbon in the hydrocarbon is released as elemental carbon.

---

This invention relates to liquid compositions, more particularly it relates to liquid compositions containing carbon.

It is known to thicken lubricating oils into greases by the use of a variety of thickening agents, for example alkali metal soaps and treated clay powders.

We have now found that lubricating oils can be thickened into greases using, as a thickening agent, a graphitic carbon product. We have also found that this carbon product can form very stable dispersions.

According to the invention there is provided a lubricating composition which comprises a blend of a lubricating base oil and a substantially non-hydrophilic graphitic carbon having a surface area measured by nitrogen adsorption of at least 170 square metres per gram, a ratio of heat of adsorption of n-dotriacontane from n-heptane to the heat of adsorption of n-butanol from n-heptane of at least 3.5:1 and a heat of adsorption of n-dotriacontane from n-heptane of at least 1 calorie per gram.

The invention also provides a grease composition which comprises a lubricating base oil thickened to a grease consistency by a substantially non-hydrophilic graphite carbon having a surface area measured by nitrogen adsorption of at least 170 square metres per gram, a ratio of heat of adsorption of n-dotriacontane from n-heptane to heat of adsorption of n-butanol from n-heptane of at least 3.5:1 and a heat of adsorption of n-dotriacontane from n-heptane of at least 1 calorie per gram.

The surface area of the graphitic carbon is preferably at least 600 square metres per gram, and more preferably at least 1000 square metres per gram.

Preferably the graphitic carbon has a heat of adsorption of n-dotriacontane from n-heptane of at least 2.0 calories per gram and more preferably at least 3 calories per gram. The graphitic carbon preferably also has a ratio of heat of adsorption of n-dotriacontane from n-heptane to heat of adsorption of n-butanol from n-heptane of at least 5:1.

The graphitic carbon preferably has a sulphur content of less than 0.8% more preferably less than 0.1% and most preferably less than 0.05% by weight.

By substantially non-hydrophilic is meant that the graphitic carbon has little affinity for distilled water, and it is difficult to wet with distilled water. When the graphitic carbon is shaken with distilled water there is a marked tendency for the graphitic carbon to separate out after the shaking has ceased.

Preferably the graphitic carbon is substantially free from water and from volatile components. By volatile components is meant compounds having an initial boiling point of below 350° C. preferably below 300° C.

The volatile components can be removed by heating the contaminated graphitic carbon to at least 300° C. preferably at least 350° C. under normal pressure. Alternatively the volatile compounds can be removed by heating under reduced pressure e.g. below 1 mm. of mercury at above 50° C. preferably above 100° C.

The graphitic carbon can be prepared by partially burning a hydrocarbon in oxygen or an oxygen containing gas at an elevated temperature so that not more than 10% by weight of the carbon in the hydrocarbon is released as elemental carbon and treating the products of the combustion to separate therefrom the graphitic carbon.

Preferably the normalized oxygen to hydrocarbon ratio is from 0.50 to 1.50 and more preferably 0.90 to 1.00 and the reaction takes place at above 1000° C. and more preferably at above 1250° C. The reaction preferably takes place at an elevated pressure, preferably of above 100 pounds per square inch gauge and more preferably above 200 pounds per square inch, preferably the pressure is in the range of 200 to 700 pounds/square inch gauge. Preferably steam is present in an amount sufficient to give a steam/hydrocarbon weight ratio of up to 2:1. Substantially pure oxygen is preferably used though oxygen diluted with other gases may be used as the combustion gas.

The separation of the graphitic carbon from the products formed by the partial combustion is preferably carried out by passing the products through water scrubbers to wash out the carbonaceous material formed. This process forms a rather unstable water slurry of the carbonaceous material.

The water can be separated from the slurry either by heating, preferably under reduced pressure, or by addition of a hydrocarbon oil for which the graphitic carbon has a very much greater affinity. When the oil is added a graphitic carbon/oil slurry is preferably formed which is readily removed from the water phase present and which takes virtually all the graphitic product with it. Also the water/carbonaceous material slurry can be contacted with a lower molecular weight hydrocarbon to separate it from the water and it is then contacted with a higher molecular weight hydrocarbon.

The graphitic carbon/oil slurry has the excess and interstitial oil removed from it to give a dry product which comprises the graphitic carbon and adsorbed oil.

In order to remove the oil from this dry product it is preferably heated with a solvent for the oil. Suitable solvents include hydrocarbons such as paraffins, e.g. hexane, and paraffins derived from petroleum, aromatic compounds, e.g. benzene and toluene and alcohols e.g. methanol and ethanol. The properties of the graphitic carbon thus obtained and the graphitic carbon obtained by removal of the water from the water/carbonaceous material slurry by heating can be enhanced by subsequent treatment stages. Preferably the graphitic product is heated under reduced pressure to a high temperature preferably the temperature is above 250° C., more preferably above 350° C. and most preferably above 500° C. After treating under reduced pressure the graphitic carbon can then be heated in a stream of hydrogen at an elevated temperature, the temperature used preferably being the same or higher than that used when the graphitic carbon is heated under reduced pressure.

Preferably not more than 10% by weight of the carbon in the hydrocarbon is released as elemental carbon. By elemental carbon is meant carbon not chemically combined with any other element i.e. excluding carbon in hydrocarbons such as methane, carbon dioxide, carbon monoxide and COS.

Preferably not more than 5% by weight of the carbon in the hydrocarbon is released as elemental carbon, more preferably from 0.5–2.5% by weight is released as elemental carbon and most preferably from 1–2% by weight is released as elemental carbon.

The heats of adsorption of n-dotriacontane and n-butanol can be measured using a flow microcalorimeter as described in Chemistry and Industry, Mar. 20, 1965, pp. 482–489.

It is known to prepare carbon in a finely divided form by the decomposition of hydrocarbons, and the products obtained are known generally as carbon blacks. Carbon blacks consist of non-graphitic particles having predominantly polar surface, but showing also a degree of oleophilic properties. When sufficient of a carbon black is added to a lubricating base oil a grease-like paste is formed; however, owing to the polar nature of the surface, the grease is not very stable and readily breaks down. Moreover, carbon blacks are not generally good lubricants and may act as abrasives.

The carbon product used in our invention is composed of relatively large planar graphite crystals which are predominantly oleophilic and non-polar. This property enables the carbon product of our invention to adsorb preferentially long chain hydrocarbons and be very effective in thickening oils.

Graphite crystals are thought to possess two different types of "sites," referred to hereinafter as "oleophilic sites" and "polar sites." The oleophilic sites are present on the basal plane area of graphite crystals and the polar sites are present on the edge area of graphite crystals. The oleophilic sites adsorb long chain paraffinic hydrocarbons and the polar sites adsorb polar compounds, the two types of adsorption being essentially independent. The grease thickening properties of graphite crystals result from their ability to strongly adsorb the long-chain molecules present in a lubricating base oil. In order to enable a suitable stable graphite structure to be built up, it is important that the proportion of basal plane sites be as large as possible, i.e., each graphite crystal should have a high ratio of basal plane to edge area. In conventional grinding techniques, the graphite crystals are broken down in two directions and both edge areas and basal-plane areas are formed. The relative amount of basal plane area present is readily shown from heat of adsorption measurements, the heat of adsorption of n-dotriacontane being indicative of the amount of basal plane area and the heat of adsorption of n-butanol being indicative of the amount of edge area. Thus, a high heat of adsorption of n-dotriacontane coupled with a low heat of adsorption of n-butanol is characteristic of a graphite having a relatively high proportion of basal-plane surface which is oleophilic and consequently is a good thickening agent.

The heat of adsorption of n-dotriacontane from n-heptane can be as high as 7.5 calories per gram or even higher in particularly preferred products.

When forming the grease, the lubricating base oil may be a mineral or synthetic oil. Suitable mineral oils are refined mineral oils obtained from petroleum, for example, those having a viscosity at 210° F. within the range from 2 to 50 centistokes, preferably from 4 to 40 centistokes.

Synthetic lubricating oils include organic esters, polyglycol ethers, polyphenyl ethers, fluorinated hydrocarbons, silicate esters, silicone oils and mixtures thereof.

The most important class of synthetic oils is the organic liquid polyesters, particularly the neutral polyesters, having a viscosity at 210° F. within the range from 1 to 30 centistokes. The expression "polyester" is used to mean esters having at least two ester linkages per molecule. The expression "neutral" is used to mean a fully esterified product. Examples of suitable polyesters include liquid diesters of aliphatic dicarboxylic acids and monohydric alcohols, such as, for example, dioctyl sebacate, dinonyl sebacate, octyl nonyl sebacate, and the corresponding azelates and adipates, liquid diesters of aliphatic dicarboxylic acids and phenols, and more complex polyesters.

The amount of the graphitic carbon required to thicken the base oil will depend on the nature of the oil and the consistency of grease required. For most purposes, an amount of up to 50% wt. based on the final grease will be used. However, it is surprising that the graphitic carbon used in our invention can thicken oils to provide greases at concentrations below 20% wt. and even below 10% by weight based on the final grease. Using a preferred graphitic product, it is possible to form a grease with a carbon content as low at 3% by wt. Preferably, the concentration of carbon in the grease is from 3–15% by wt.

The grease can be formed by stirring the carbon product into the base oil or by milling the carbon product in the oil in a colloid mill.

If desired, additives, such as antioxidants, viscosity-index improvers, anti-corrosion agents, load-carrying additives etc., can be added to the grease compositions.

When the carbon product is stirred into liquids in a concentration too low to thicken the liquid into a grease, very stable black suspensions are produced. These suspensions, especially when the liquid medium contains long chain paraffinic molecules, retain the carbon in suspension for exceptionally long periods.

In order to improve the lubricating load carrying properties of the greases according to the present invention, conventional load-carrying additives can be used. However, preferably, oleophilic graphite is used as the additive.

Oleophilic graphite also functions as a grease-thickener but is not so effective as the graphitic carbon of the present invention, but is an effective lubricant load-carrying additive. Thus it is possible to modify the properties of the grease by adding oleophilic graphite to it either in addition to, or as substitute for part of, the graphitic carbon.

Such mixed thickener greases preferably contain up to 20% by wt. more preferably up to 15% by wt. and most preferably up to 10% by wt. of oleophilic graphite. The amount of graphitic carbon present will be sufficient to prepare a grease of the required consistency and usually up to 10% by weight and preferably up to 5% by weight.

Oleophilic graphite has a surface area of at least 10 square metres per gram, a heat of adsorption of n-dotriacontane from n-heptane of at least 700 millicalories per gram and a heat of adsorption of n-butanol from n-heptane of less than 200 millicalories per gram. It is prepared by grinding graphite in an organic liquid preferably in the substantial absence of air.

It has also been very surprisingly found that small amounts of the graphitic carbon improve the viscosity index of lubricating oils. The viscosity index of a lubricating oil is a measure of the variation of its viscosity with temperature, the higher the viscosity index the less is the change of viscosity with change in temperature.

The invention will now be described with reference to the following examples in which Example 1 describes the preparation of the graphitic carbon.

EXAMPLE 1

A residual fuel oil was reacted with oxygen and steam at a temperature of 1500° C. at a pressure of 350 p.s.i.g. The gaseous product formed consisted of 90% carbon monoxide and hydrogen, but methane, hydrogen sulphide carbon dioxide COS and nitrogen were also present. The conditions were such that about 1.5% by wt. of carbon, based on the hydrocarbon feed, was produced.

The gaseous reaction product containing the carbon was passed through water scrubbers and a slurry of graphitic carbon and water separated. The slurry was contacted with excess of a residual fuel oil. Virtually all the graphitic carbon absorbed by the fuel oil and this oily phase separated from the water. free oil was removed and a product obtained comprising approximately 14% of the oil slurry.

This product was refluxed with toluene for 16 hours and the graphitic carbon separated. The properties of this graphitic carbon are shown in Table 1.

TABLE 1

Heat of adsorption of $nC_{32}$ from n-Heptane in cal./grm. and surface area calculated therefrom in $m.^2$/grm.:

Heat of adsorption, 5.0
Surface area, 445

Heat of adsorption of n-Butanol from n-Heptane in cal./grm. and surface area calculated therefrom in $m.^2$/grm.:

Heat of adsorption, 0.17
Surface area, 8

BET surface area $N_2$ adsorption, 670

EXAMPLE 2

The graphitic carbon of Example 1 was stirred into a 160/95 grade refined lubricating oil obtained from a Middle East crude petroleum. The grade reference signifies a viscosity of 160 seconds Redwood 1 (389 centistokes) at 140° F. and a viscosity index of 95. A grease was formed.

Two conventional anti-oxidants were also added in conventional amounts to a grease containing 5% of the graphitic carbon.

A further grease was prepared by stirring into the 160/95 grade lubricating oil 3% of the graphitic carbon and 8.8% of oleophilic graphite.

The properties of these grease is given in Table 2.

TABLE 2

| | Unworked penetration, mm.$^{-1}$ | Worked penetration 60 strokes, mm.$^{-1}$ | Bleed percent wt. |
|---|---|---|---|
| (1) 3.8% Graphitic carbon | 324 | 320 | |
| (2) 5.2% Graphitic carbon | 273 | 276 | |
| (3) 5% Graphitic carbon plus 2% antioxidant A | 252 | 248 | 3.7 |
| (4) 5% Graphitic carbon plus 1% antioxidant B | 272 | 256 | 4.5 |
| (5) 3% Graphitic carbon plus 8.8% oleophilic graphite | 226 | 234 | 1.3 |

NOTE.—Antioxidant A was zinc dialkyl dithiophosphate; Antioxidant B was phenyl-α-naphthylamine.

The drop point of all these greases was about 250° C. The grease compositions 3 and 4 were tested in an oxidation bomb at 100° C. and the pressure drop after 100 hours measured.

The results are given in Table 3.

TABLE 3

Grease Composition: Pressure drop p.s.i.
  Graphitic carbon +2% Antioxidant A _____ 3.5
  Graphitic carbon +1% Antioxidant B _____ 9.5

Grease 3 and 4 were tested in Skefko Rigs at 125° C. and passes were obtained in both cases.

Greases 3 and 4 were tested in the IP Rig at 150° C. and the wear of the bearing elements was light.

EXAMPLE 3

The graphitic carbon was admixed in 1% w./w. in the 160/95 grade oil to form a very stable suspension. When the viscosity index was measured by the Sherley Ferranti Viscometer it was found to have increased to from 95 to 145.

The suspension was found to show no discernible separation after 24 hours.

EXAMPLE 4

A further sample of graphitic carbon was prepared as in Example 1. This sample had the properties shown in Table 4.

TABLE 4

Surface area by $N_2$ absorption BET, 1,100.
Heat of Adsorption of n-dotriacontane from n-heptane (2% soln.), 6.8.
Heat of adsorption of n-butanol from n-heptane (2% soln.), 0.4.

This graphitic carbon was stirred into a lubricating oil of viscosity 160 Redwood No. 1 secs. at 140° F. and viscosity index of 95.

The properties of the greases formed are shown in Table 5.

TABLE 5

| | Penetration ¼ scale | | Whole scale worked 60 strokes | Bleed |
|---|---|---|---|---|
| | Unworked | Worked 60 strokes | | |
| Percent thickener: | | | | |
| 4 | 86 | 87 | 350 (372) | 7.9 |
| 5 | 71 | 71 | 290 (316) | 3.3 |
| 6 | 64 | 64 | 264 (291) | 2.4 |
| 7 | 60 | 60 | 248 (278) | 1.8 |
| 8 | 48 | 49 | 208 (238) | 1.9 |

6% by weight of the graphitic carbon was stirred into two synthetic oils and the results shown in Table 6.

TABLE 6

| | ¼ Scale penetration | | Whole scale penetration worked 60 strokes | Bleed |
|---|---|---|---|---|
| Synthetic oil type | Unworked | Worked 60 strokes | | |
| Poylphenyl ether | 43 | 45 | 193 (224) | 0.3 |
| Complex ester | 68 | 70 | 287 (313) | 5.5 |

The Whole Scale penetration figures in Table 5 and 6 are the converted ¼ scale values. The figues in brackets were the values obtained using a conversion factor which was found to give a more accurate value for the actual whole scale figures for a graphite thickened grease. The other figures apply to the value obtained using a conversion factor applicable to soap-thickened greases.

The 5% mineral based grease and the complex ester based grease were tested in a RAE storage stability test and were both found to pass.

What we claim is:

1. An oleophilic graphite with a surface area of 170–1000 square meters per gram prepared by reacting hydrocarbons with oxygen and steam at a temperature above 1000° C. and a pressure over 100 pounds per square inch gauge until not more than 10% of the carbon is released as oleophilic graphite, wherein the weight ratio of steam to hydrocarbon at the start of the reaction is not greater than 2:1, separating the oleophilic graphite from the reaction mixture by passing the reaction mixture through water scrubbers to form a water slurry of the oleophilic graphite, removing the water by heating said slurry under reduced pressure.

2. A lubricating composition consisting of lubricating oil containing an effective amount of the oleophilic graphite of claim 1.

References Cited

UNITED STATES PATENTS 3,383,311  5/1968  Groszek _____ 252—29

DANIEL E. WYMAN, Primary Examiner

I. VAUGHN, Assistant Examiner

U.S. Cl. X.R.

252—55; 23—209.1, 209.2, 209.6.

UNITED STATES PATENT OFFICE
CERTIFICATE OF CORRECTION

Patent No. 3,532,625　　　　　　　　Dated October 6, 1970

Inventor(s) Aleksander Jerzy Groszek and Douglas Keith Nicholas

It is certified that error appears in the above-identified patent and that said Letters Patent are hereby corrected as shown below:

Column 4, line 75, "absorbed" should read -- adsorbed --;

Column 5, line 1, after "water." insert -- The --;

Column 5, Table 2, the first heading from the left should read -- Unworked penetration, mm.$^{-1}$ --;

Column 5, Table 2, the second heading from the left should read -- Worked penetration 60 strokes, mm.$^{-1}$ --.

Signed and sealed this 15th day of February 1972.

(SEAL)
Attest:

EDWARD M. FLETCHER, JR.　　　　　　ROBERT GOTTSCHALK
Attesting Officer　　　　　　　　　Commissioner of Patents